US011675990B2

(12) United States Patent
Kubo

(10) Patent No.: US 11,675,990 B2
(45) Date of Patent: Jun. 13, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideki Kubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/850,063

(22) Filed: Jun. 27, 2022

(65) Prior Publication Data

US 2023/0004768 A1 Jan. 5, 2023

(30) Foreign Application Priority Data

Jul. 1, 2021 (JP) .............................. JP2021-110121

(51) Int. Cl.
*G06K 15/02* (2006.01)
(52) U.S. Cl.
CPC ................................ *G06K 15/1823* (2013.01)
(58) Field of Classification Search
CPC ............... H04N 1/6097; H04N 1/6088; G06K 15/1848; G06K 15/1868; G06K 15/1823
See application file for complete search history.

(56) References Cited

U.S. PATENT DOCUMENTS

| 2017/0282542 | A1* | 10/2017 | Ozawa | ................... B41J 2/2103 |
| 2017/0374239 | A1* | 12/2017 | Ishii | ..................... H04N 23/741 |
| 2019/0037085 | A1* | 1/2019 | Inaba | .................... H04N 1/6097 |

FOREIGN PATENT DOCUMENTS

JP 2013123809 A 6/2013

* cited by examiner

*Primary Examiner* — Iriana Cruz
(74) *Attorney, Agent, or Firm* — Venable LLP

(57) ABSTRACT

An image processing apparatus including a first obtaining unit configured to obtain first image data to be printed, a second obtaining unit configured to obtain second image data indicating a subject identical to that of the first image data and expressed by a geometric condition different from that of the first image data, and a determination unit configured to determine ink amounts of respective inks including a first ink that reflects light in a normal reflection and a second ink that is different from the first ink and has a ratio of an intensity of light reflected in the normal reflection direction to an intensity of light reflected in the diffuse direction smaller than that of the first ink in a case where light based on brightness at each position of the first image data and the second image data.

20 Claims, 12 Drawing Sheets

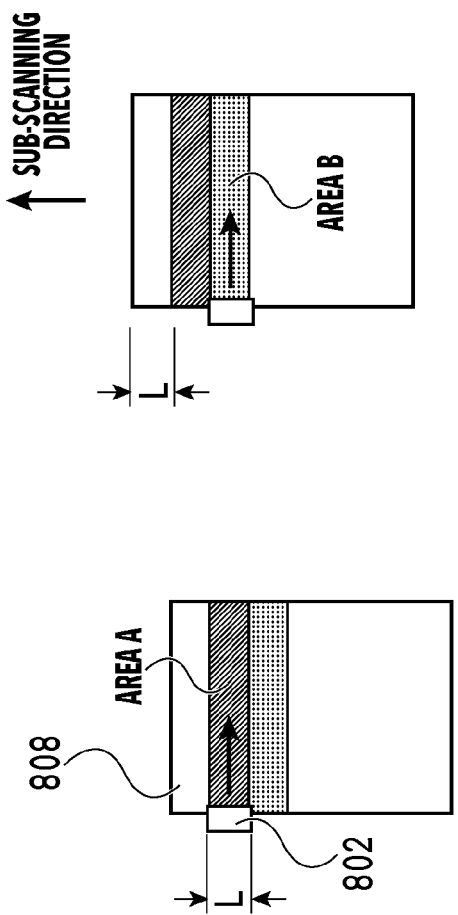
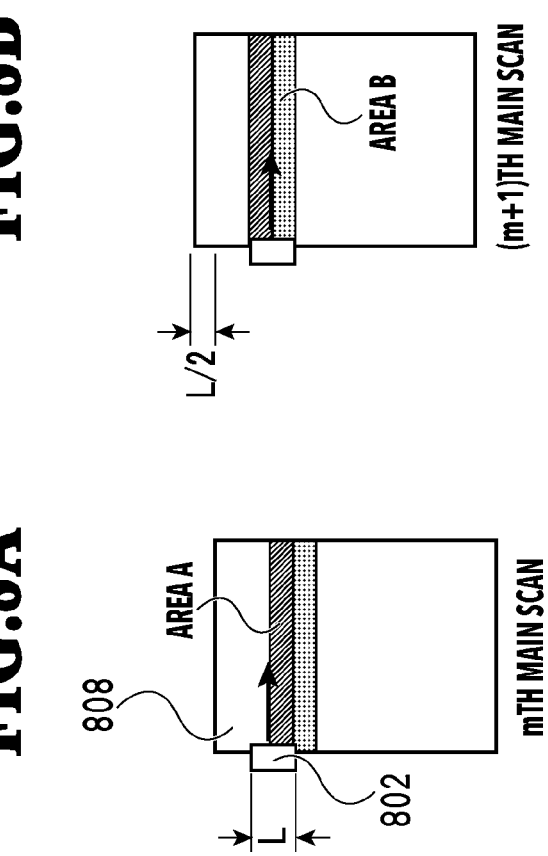

IMAGE PROCESSING APPARATUS, IMAGE PROCESSING METHOD, AND STORAGE MEDIUM

Cross-Reference to Priority Application

This application claims benefit of Japanese Patent Application No. 2021-110121, filed Jul. 1, 2021, which is hereby incorporated by reference in its entirety.

BACKGROUND OF THE INVENTION

Field of the Invention

The present invention relates to an image processing technique to perform image formation with an ink having brightness differing according to an observation condition.

Description of the Related Art

A metallic ink or gloss ink containing metal particles and capable of providing a metallic luster on a print medium has been recently used for printing with a printing apparatus or the like. The metallic ink or gloss ink is also used together with a color ink and there are presented various printing methods of adding a metallic luster to high-definition color printing.

For example, in Japanese Patent Laid-Open No. 2013-123809, a three-dimensional appearance is given to a printed product by a difference in gloss between portions with and without a metallic ink. This publication also discloses a method of giving a three-dimensional appearance to a printed product by gradation printing with a metallic ink.

SUMMARY OF THE INVENTION

However, gradation to be given is selected from predetermined patterns or set by a user. Accordingly, there is a case when it is impossible to understand what gradation expression is suitable for giving a three-dimensional appearance to an object or subject to be reproduced as an image, with the result that a suitable three-dimensional appearance cannot be provided.

An image processing apparatus according to an aspect of the present invention is an image processing apparatus generating data for forming an image on a print medium, the image processing apparatus comprising a first obtaining unit configured to obtain first image data to be printed, a second obtaining unit configured to obtain second image data indicating a subject identical to that of the first image data and expressed by a geometric condition different from that of the first image data, and a determination unit configured to determine ink amounts of respective inks including a first ink and a second ink based on brightness at each position of the first image data and the second image data, wherein the image is printed using the first ink that reflects light in a normal reflection direction at an intensity different from an intensity of light reflected in a diffuse direction in a case when light is made incident at a predetermined angle on the first ink provided on the medium, and the second ink that is different from the first ink and has a ratio of an intensity of light reflected in the normal reflection direction to an intensity of light reflected in the diffuse direction smaller than that of the first ink in a case when light is made incident at the predetermined angle on the second ink provided on the medium.

Further features of the present invention will become apparent from the following description of exemplary embodiments with reference to the attached drawings.

BRIEF DESCRIPTION OF THE DRAWINGS

FIGS. 8A to 8E are diagrams illustrating operation of the image forming apparatus;

DESCRIPTION OF THE EMBODIMENTS

Embodiments of the present invention will be hereafter described with reference to the drawings. The following embodiments do not necessarily limit the present invention. Further, not all combinations of the features described in the embodiments are necessarily essential for means to solve the problem to be solved by the present invention.

First Embodiment

Hardware Configuration of Image Processing Apparatus 1

Figure 1:
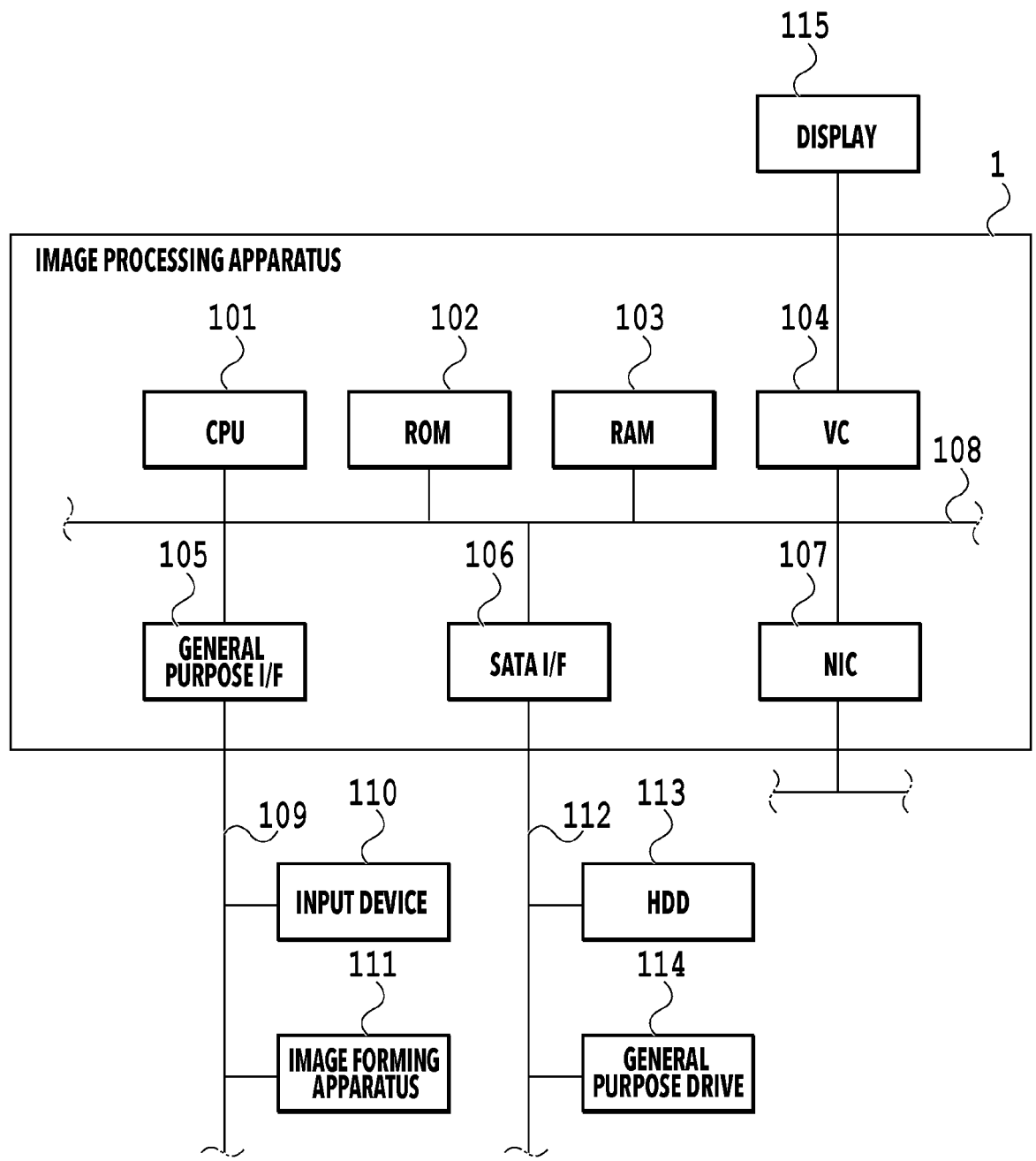
FIG. 1 is a diagram showing a hardware configuration of an image processing apparatus.

FIG. 1 is a diagram showing a hardware configuration of an image processing apparatus 1. For example, the image processing apparatus 1 is a computer. The image processing apparatus 1 comprises a CPU 101, a ROM 102, a RAM 103, a video card (VC) 104, a general purpose interface (I/F) 105, a serial ATA (SATA) I/F 106, and a network interface card (NIC) 107.

The CPU 101 executes an operating system (OS) or various programs stored in the ROM 102, a hard disk drive (HDD) 113, or the like, using the RAM 103 as a work memory. The CPU 101 also controls each element via a system bus 108. Incidentally, in the processing of flowcharts to be described later, a program code stored in the ROM 102, HDD 113, or the like, is loaded into the RAM 103 and executed by the CPU 101. The VC 104 is connected to a display 115. The general purpose I/F 105 is connected to an input device 110 such as a mouse or a keyboard, or an image forming apparatus 111 via a serial bus 109. The SATA I/F 106 is connected to the HDD 113 or a general purpose drive 114 that performs reading and writing of various recording media via a serial bus 112. The NIC 107 performs input/output of information to an external apparatus. The CPU 101 uses the HDD 113 or various recording media mounted on the general purpose drive 114 as a storage location of various kinds of data. The CPU 101 displays a user interface (UI) screen provided by a program on the display 115 and receives input of a user instruction, or the like, accepted via the input device 110.

Principle of Three-Dimensional Appearance Perception

In the present embodiment, a printed product to which image processing has been applied exhibits different brightness distributions according to observation conditions, which is utilized to allow an observer to perceive a three-dimensional appearance.

Figure 2:
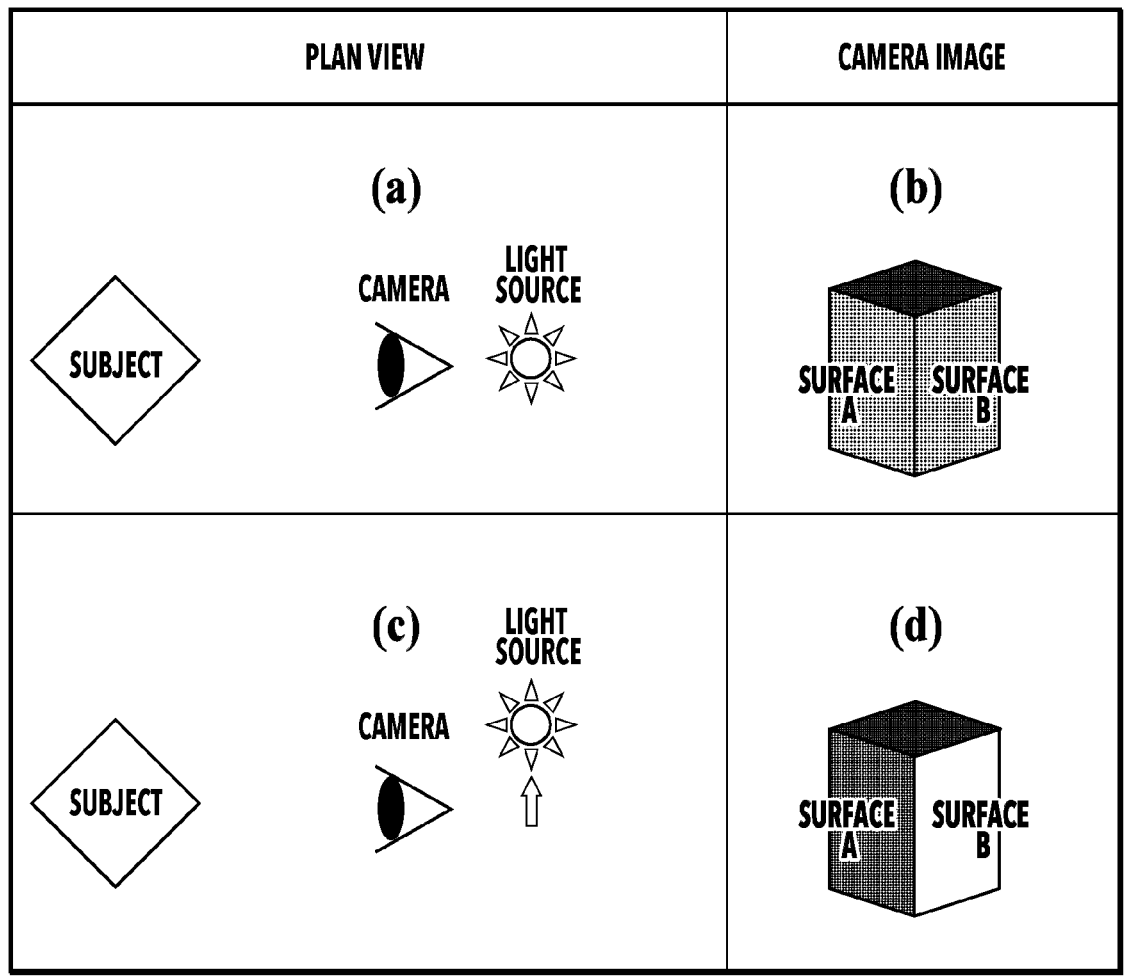
FIG. 2 is a conceptual diagram illustrating a principle concerning a three-dimensional appearance perception.

FIG. 2 is a conceptual diagram illustrating a principle concerning a three-dimensional appearance perception. A plan view of FIG. 2(a) indicates the relationship among a light source, a subject, and a camera. Here, the subject is a quadrangular prism and normals of surfaces A and B of the subject are inclined 45° with respect to a direction of the light source and camera. At this time, in a case when the surfaces A and B have the same reflectance, the brightness of the surfaces A and B is the same as shown in a camera image of FIG. 2(b). A plan view of FIG. 2(c) shows that the light source has moved in the direction of an arrow from the position shown in the plan view of FIG. 2(a). At this time, an image captured by the camera is as shown in a camera image of FIG. 2(d). Since the light source has moved closer to an orientation facing the surface B, the surface B looks bright and the surface A contrarily looks dark as compared with the camera image FIG. 2(b).

In conventional two-dimensional printing, a surface normal is identical to a direction orthogonal to a printed product at any position of an image. Accordingly, even in a case when the position of the light source is changed at the time of observation, the brightness of the surfaces A and B varies in the same manner and it is impossible to recognize a three-dimensional shape by a change of brightness as described above. In the present embodiment, the reproduction of a change of brightness according to a normal of a subject made by a difference of position of the light source is treated as one of factors for recognizing a three-dimensional shape in a printed product.

Figure 3:
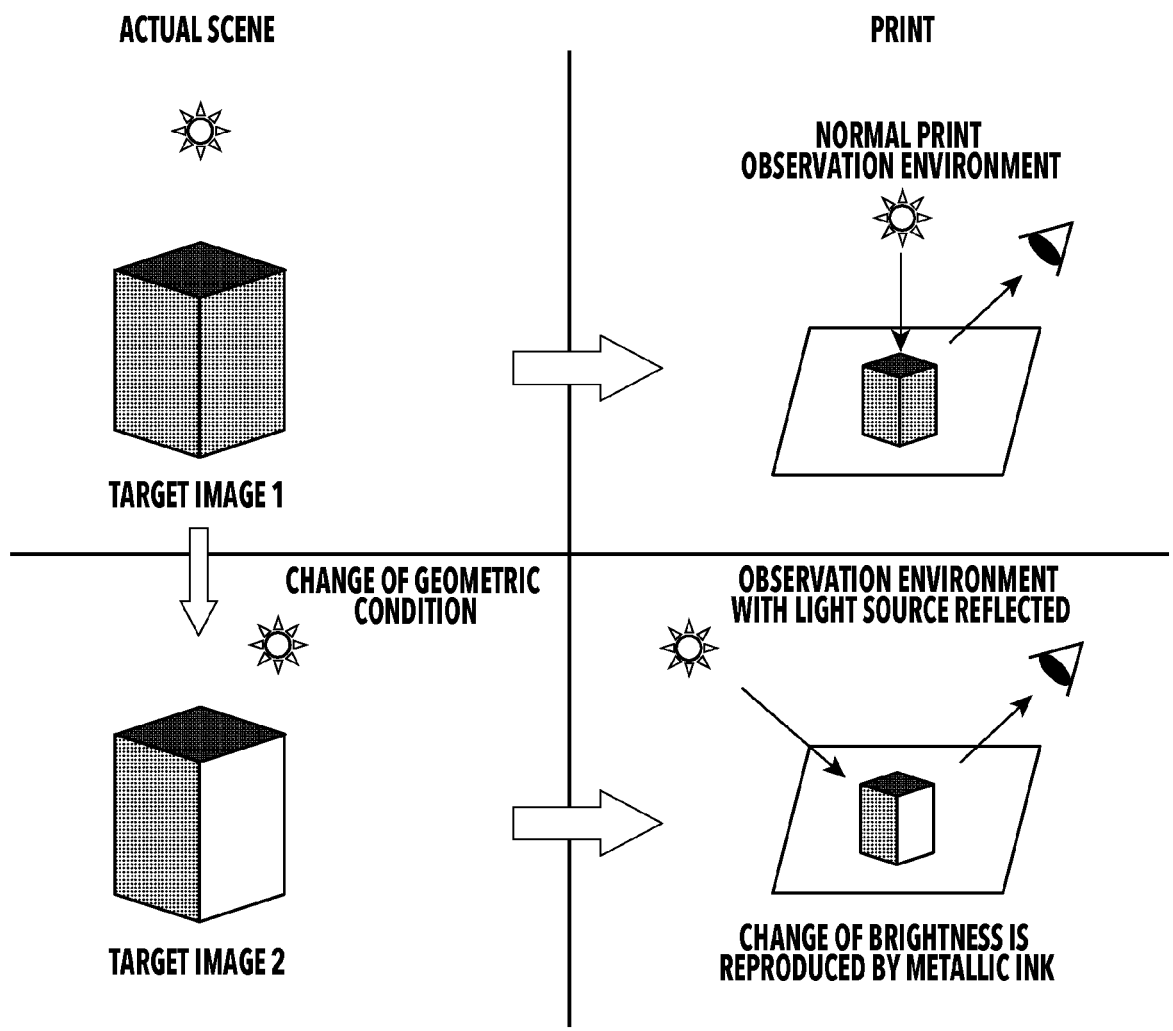
FIG. 3 is a schematic diagram showing an effect of image processing.

FIG. 3 is a schematic diagram showing an effect of image processing. In the present embodiment, as illustrated in FIG. 2, two scenes different in a geometric condition such as a light source position are input as target images. As shown in FIG. 3, a printed product reproduces a target image 1 in one observation environment and a target image 2 in the other observation environment, thereby simulating a change of the geometric condition of the scenes and providing a three-dimensional appearance. More specifically, the target image 1 reproduces a normal image observation environment, that is, an observation environment in which the main light source is not reflected in the printed product. The target image 2 intentionally reproduces an observation environment in which the main light source is reflected in the printed product.

In a case when light is made incident at a predetermined angle on a metallic ink provided on a medium such as a printed product, the intensity of light reflected in a normal reflection direction is different from the intensity of light reflected in a diffuse direction. In short, the metallic ink has high directivity in a direction in which light is reflected and reflects more light in the normal reflection direction. Thus, the appearance of a printed product using a metallic ink is largely influenced by the brightness of what is reflected in the normal reflection direction. In the present embodiment, the amount of reflection light in the normal reflection direction at each position of a printed product is controlled by changing the amount of metallic ink. An observer observes a printed product while tilting the printed product to reflect and evade the light source, thereby perceiving a change of brightness between the respective positions of the printed product. This enables the printed product to be perceived as if the illumination of the subject in the printed product is changed and give the printed product with a three-dimensional appearance. In contrast, in a case when light is made incident at a predetermined angle on a color ink such as a C, M, Y, or K ink provided on a medium, a ratio of the intensity of light reflected in the normal reflection direction to the intensity of light reflected in the diffuse direction is small. The characteristics of the metallic and color inks will be described below with reference to FIG. 4.

Figure 4:
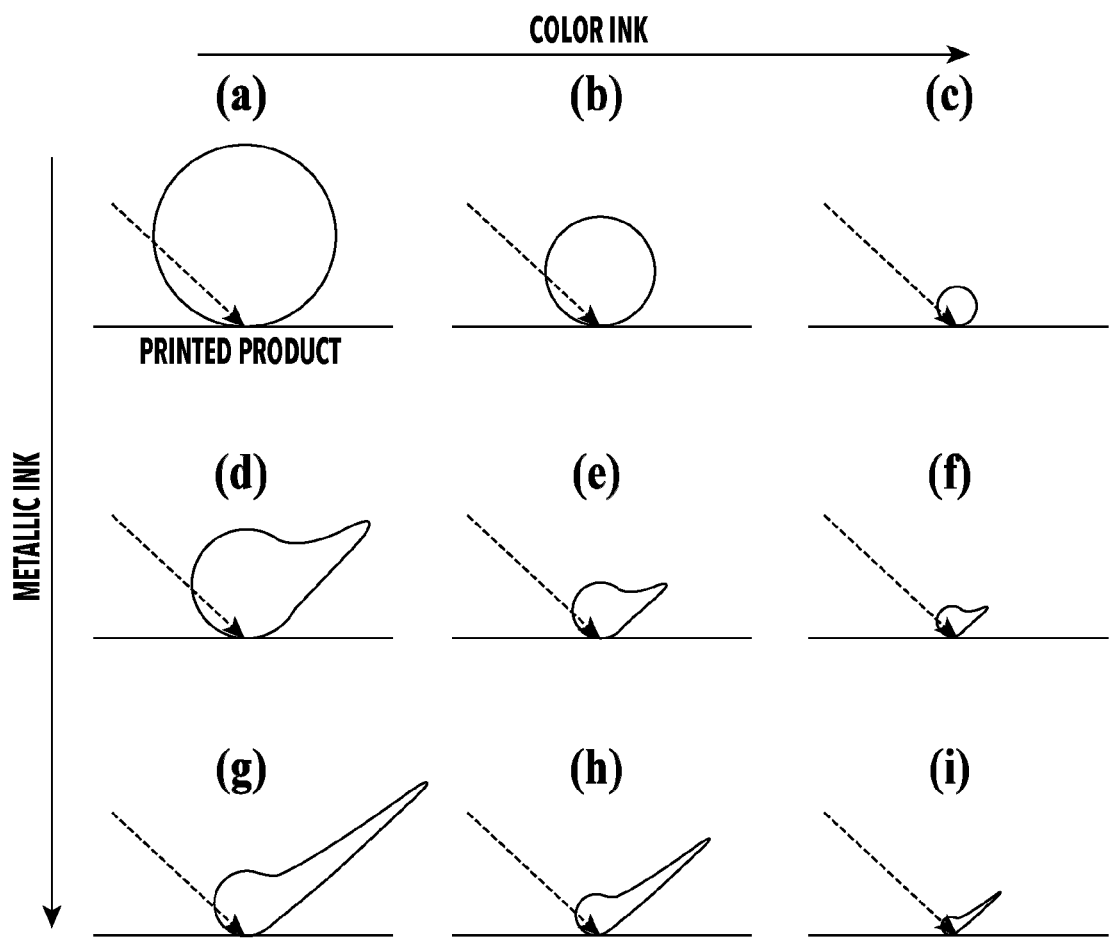
FIG. 4 is a schematic diagram illustrating gonio-spectral reflection characteristics of a printed product.

FIG. 4 is a schematic diagram showing gonio-spectral reflection characteristics in a printed product using the color ink and the metallic ink. The gonio-spectral reflection characteristic is a characteristic indicating a difference in brightness between different geometric conditions. Patterns of FIGS. 4(a) to 4(i) show gonio-spectral reflection characteristics in a case when different amounts of color and metallic inks are used. The patterns of FIGS. 4(a) to 4(i) show that the amount of color ink increases toward the right in the direction of the arrow and that the amount of metallic ink increases downward in the direction of the arrow. A dashed line arrow indicates light incident on the printed product and a shape on the printed product indicates the intensity of light reflected from the incident point of the light to each angle. The upper left pattern of FIG. 4(a) shows a gonio-spectral reflection characteristic of a blank sheet with no ink printed thereon. In this distribution, the reflection, or the like, has a small bias toward a specific direction and a change of brightness is small when viewed from any angle. The pattern of FIG. 4(c) indicates a gonio-spectral reflection characteristic in the case of printing only with the color ink. Although a bias per angle is small like the pattern of FIG. 4(a), since the color ink absorbs light, the amount of reflection decreases as the amount of color ink increases. The pattern of FIG. 4(g) indicates a gonio-spectral reflection characteristic in the case of printing only with the metallic ink. The metallic ink has high directivity and reflects strong light in the normal reflection direction. Due to the above characteristics, in a case when an observation angle is changed by the same amount from the normal reflection light to the diffuse direction, a change of brightness of the metallic ink is larger than that of the color ink. As a result, in a case when the metallic ink is observed with the light source reflected, it looks bright according to the brightness of the light source. However, since the metallic ink includes few components diffusing in directions other than the normal reflection direction, it looks dark in a case when the light source is not reflected.

Both of the color ink and the metallic ink can generate intermediate characteristics by area coverage modulation like the patterns of FIGS. 4(b) and 4(d). In a case when the color ink and the metallic ink are mixed like the patterns of FIGS. 4(e), 4(f), 4(h), and 4(i), characteristics can be generated by combining the respective gonio-spectral reflection characteristics. Incidentally, in actuality, printing only with the color ink generally exhibits slightly strong reflection in the normal reflection direction as compared with the other directions, but the amount of reflection is smaller than that of the metallic ink and is therefore neglected for ease of explanation. Such a difference in gonio-spectral reflection characteristics is modeled as the bidirectional reflectance distribution function, and the like, and can be measured by a commercially available BRDF measurement device.

Figure 5:
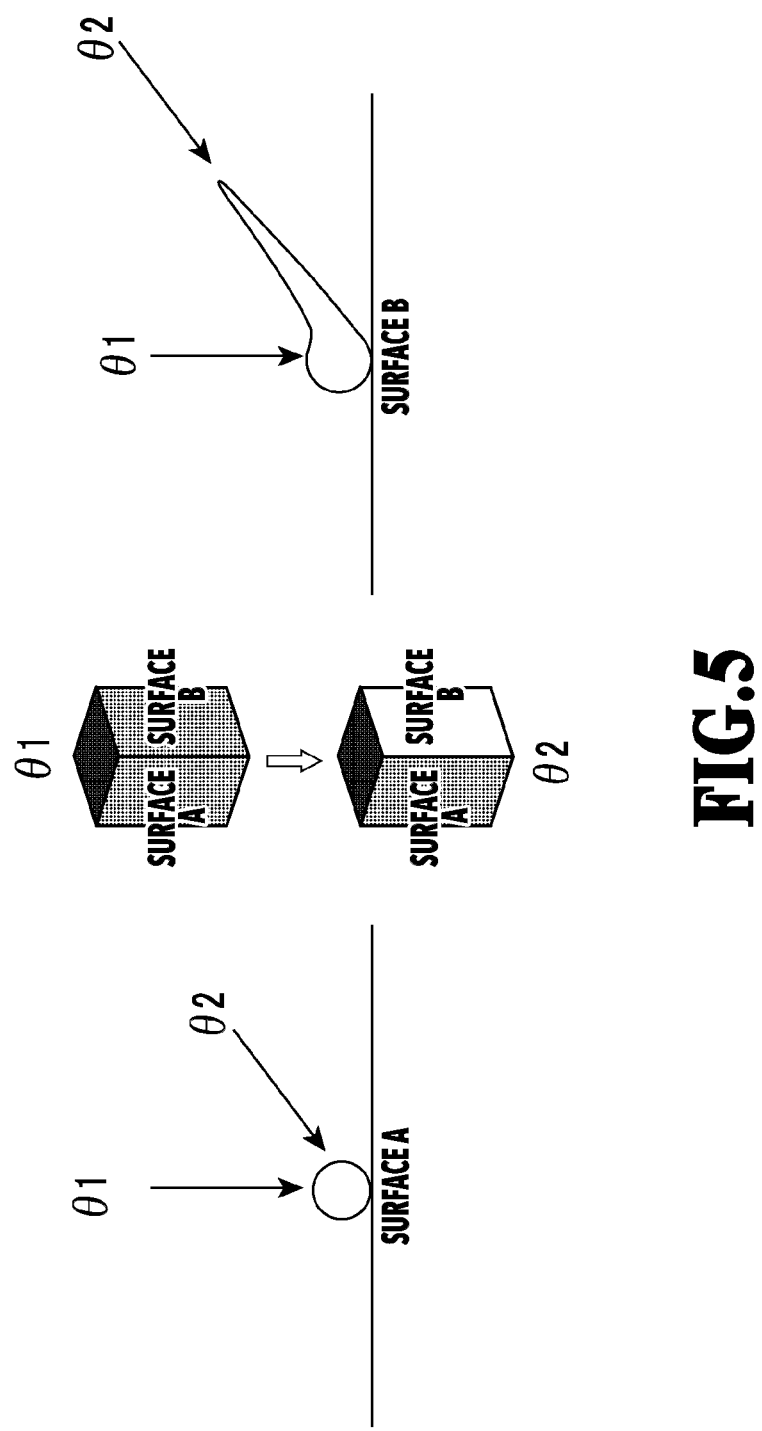
FIG. 5 is a schematic diagram illustrating a mechanism to obtain a three-dimensional appearance perception effect.

FIG. 5 is a schematic diagram illustrating a mechanism to give a three-dimensional appearance to a printed product using the gonio-spectral reflection characteristics of the metallic ink. FIG. 5 shows an example of a two-dimensional printed product in which an area expressing the surface A is printed with only the color ink and an area expressing the surface B is printed with both of the color and metallic inks. In the case of observation from an angle θ1, the surfaces A and B are substantially equal in brightness. In contrast, in the case of observation from an angle θ2, the surface B printed with the metallic ink makes a strong reflection in the normal reflection direction and is therefore perceived as being brighter than the surface A. In this manner, by associating a change of brightness with the amount of printing of the metallic ink, a change of brightness in the case of reflecting the light source simulates a change of geometric condition of the actual scene and the three-dimensional appearance can be perceived.

Logical Configuration of Image Processing Apparatus 1

Figure 6:
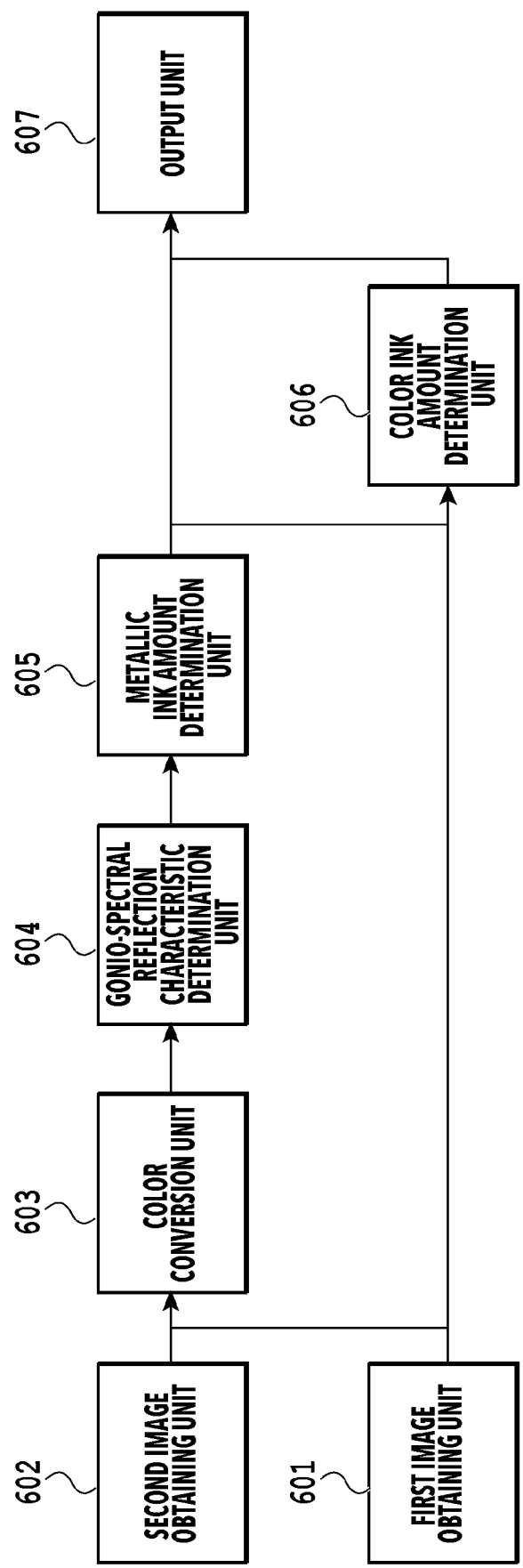
FIG. 6 is a diagram showing a logical configuration of the image processing apparatus.

FIG. 6 is a diagram showing a logical configuration of the image processing apparatus 1. The CPU 101 of the image processing apparatus 1 comprises a first image obtaining unit 601, a second image obtaining unit 602, a color conversion unit 603, a gonio-spectral reflection characteristic determination unit 604, a metallic ink amount determination unit 605, a color ink amount determination unit 606, and an output unit 607.

The first image obtaining unit 601 obtains first image data indicating a scene of a subject under a geometric condition. The second image obtaining unit 602 obtains second image data. The second image data is image data indicating a scene of the same subject as that of the first image data under a geometric condition different from that of the first image data. The color conversion unit 603 converts color information of the first image data and second image data into tristimulus values XYZ. The gonio-spectral reflection characteristic determination unit 604 determines a difference in brightness between the two images from the tristimulus values of the first image data and second image data. The metallic ink amount determination unit 605 determines the amount of metallic ink from the difference in brightness between the first image data and the second image data. The color ink amount determination unit 606 determines the amount of color ink based on the first image data and the amount of metallic ink. The output unit 607 outputs the determined amounts of metallic and color inks to the image forming apparatus 111.

Configuration of Image Forming Apparatus 111

Figure 7:
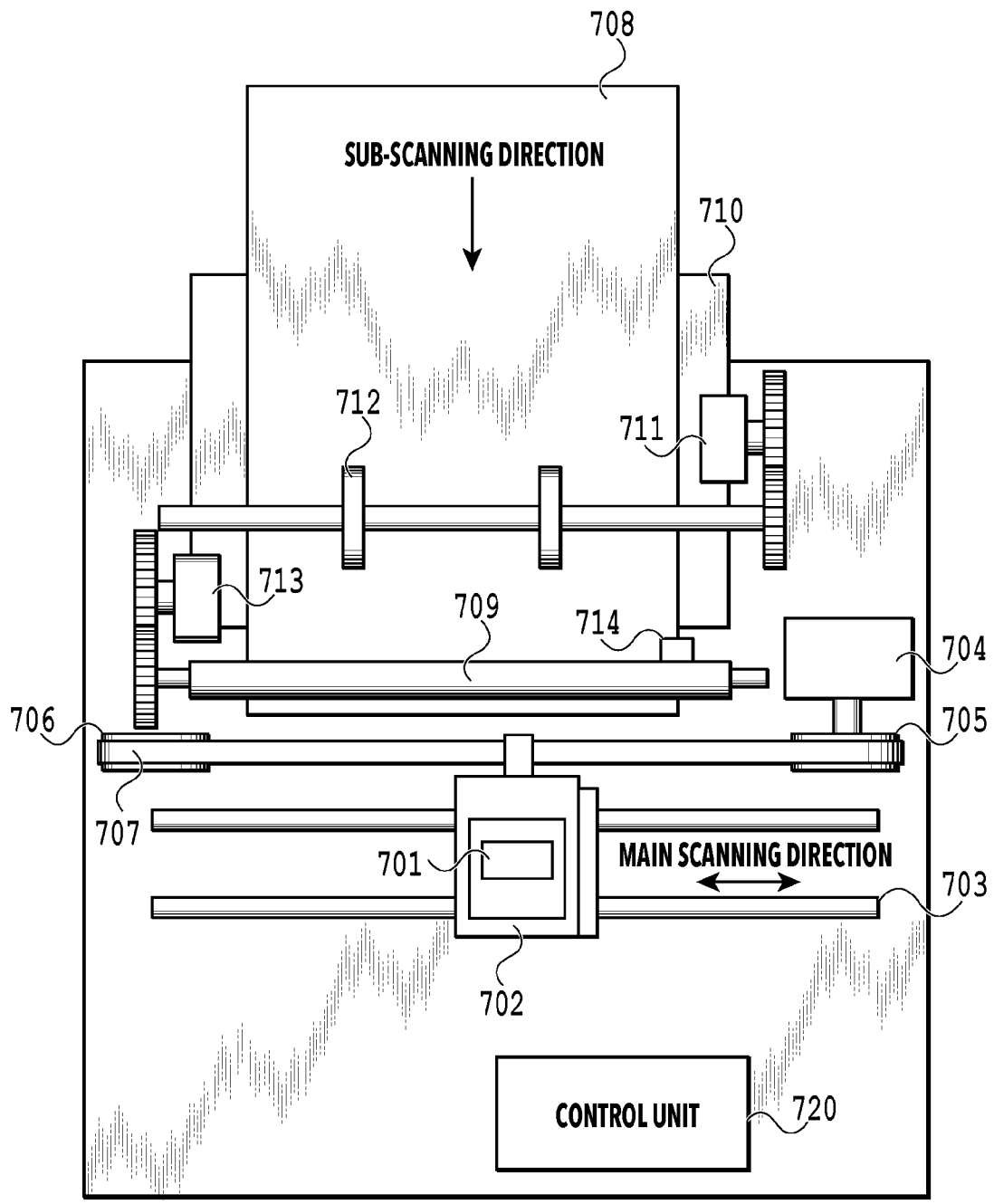
FIG. 7 is a configuration diagram of an image forming apparatus.

FIG. 7 is a configuration diagram of the image forming apparatus 111. The image forming apparatus 111 in the present embodiment is, for example, an inkjet printer that forms an image by performing printing on a print medium with ink.

The image forming apparatus 111 comprises a head cartridge 701, a carriage 702, a guide shaft 703, a main scanning motor 704, a motor pulley 705, a driven pulley 706, a timing belt 707, a print medium 708, and a conveying roller 709. The image forming apparatus 111 also comprises an auto sheet feeder (hereinafter referred to as an ASF) 710, a paper feed motor 711, pickup rollers 712, a line feed motor (hereinafter referred to as an LF motor) 713, a sheet end sensor 714, and a control unit 720.

The head cartridge 701 comprises a print head including a plurality of ejection ports and an ink tank that supplies ink to the print head. The head cartridge 701 is also equipped with a connector for receiving a signal or the like driving each ejection port of the print head. The ink tank is independently filled with five inks in total: color inks (cyan, magenta, yellow, and black) and a metallic ink.

The head cartridge 701 is exchangeably mounted on the carriage 702 and the carriage 702 is provided with a connector holder for transferring a drive signal or the like to the head cartridge 701 via the connector. The carriage 702 is capable of reciprocal movement along the guide shaft 703. More specifically, the carriage 702 is driven and its position and movement are controlled by drive mechanisms such as the motor pulley 705, the driven pulley 706, and the timing belt 707 using the main scanning motor 704 as a drive source. Incidentally, in the preset embodiment, the movement of the carriage 702 along the guide shaft 703 is referred to as "main scan" and the direction of the movement is referred to as "the main scanning direction."

The print medium 708 such as a print sheet is placed on the ASF 710. In image forming, the pickup rollers 712 are rotated via a gear by drive of the paper feed motor 711 and the print medium 708 is separated and fed from the ASF 710 one by one. The print medium 708 is further conveyed by rotation of the conveying roller 709 to a print start position facing an ejection port surface of the head cartridge 701 on the carriage 702. The conveying roller 709 is driven via a gear using the LF motor 713 as a drive source. Whether the print medium 708 is fed is determined and a feeding position is defined at the time when the print medium 708 passes by the sheet end sensor 714. The head cartridge 701 mounted on the carriage 702 is held such that the ejection port surface projects downward from the carriage 702 and is parallel to the print medium 708. The control unit 720 includes a CPU, a storage unit, or the like. The control unit 720 receives data externally to form each of the layers described above and controls the operation of each part of the image forming apparatus 111 based on the data.

Operation of Image Forming Apparatus 111

An image forming operation in the image forming apparatus 111 will be described below. In the present embodiment, an inkjet sheet in general use is used as the print medium 708. First, in a case when the print medium 708 is conveyed to a predetermined print start position, the carriage 702 moves over the print medium 708 along the guide shaft 703. During the movement, the metallic and color inks are ejected from the ejection ports of the print head. After the carriage 702 moves to one end of the guide shaft 703, the conveying roller 709 conveys the print medium 708 by a predetermined amount in a direction orthogonal to the main scanning direction of the carriage 702. In the present embodiment, the conveyance of the print medium 708 is referred to as "sheet feeding" or "sub-scan" and the direction of the conveyance is referred to as "sheet feeding direction" or "sub-scanning direction." After the conveyance of the print medium 708 by the predetermined amount is finished, the carriage 702 moves again along the guide shaft 703. In this manner, the scan and sheet feeding are repeated by the carriage 702 of the print head, whereby an image is formed on the print medium 708.

FIGS. 8A to 8E are diagrams illustrating operation of forming an image by the print head scanning the print medium 708. In the present embodiment, as shown in FIGS. 8A and 8B, the carriage 702 performs a main scan to form a layer by a width L of the print head. Each time the printing of one line is finished, the print medium 708 is conveyed by the distance L in the sub-scanning direction.

Incidentally, there is a case when so-called multi-pass printing is performed in order to suppress deterioration in image quality such as periodic unevenness caused by drive accuracy of the print head. FIGS. 8C to 8E show an example of dual-pass printing. In this example, the carriage 702 performs a main scan to form a layer by the width L of the print head and the print medium 708 is conveyed by a distance L/2 in the sub-scanning direction each time the printing of one line is finished. An area A is printed by the $m^{th}$ main scan (FIG. 8C) and $(m+1)^{th}$ main scan (FIG. 8D) of the print head. An area B is printed by the $(m+1)^{th}$ main scan (FIG. 8D) and $(m+2)^{th}$ main scan (FIG. 8E) of the print head.

Although the operation of dual-pass printing is described, the number of passes used for printing can be changed according to desired accuracy. For example, in the case of performing n-pass printing, the print medium 708 is conveyed by a distance L/n in the sub-scanning direction each time the printing of one line is finished. Incidentally, the print medium 708 is not limited to paper and various materials can be used as long as a layer can be formed by the print head.

Figure 9:
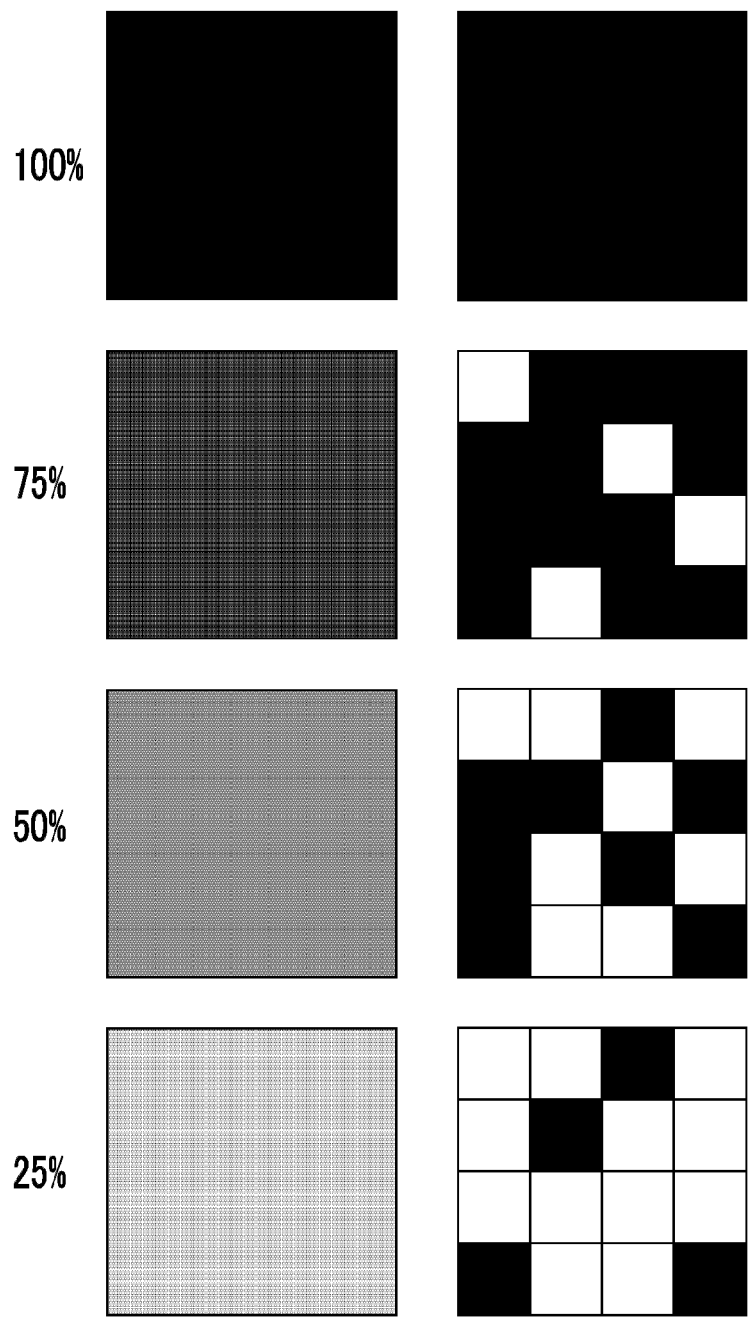
FIG. 9 is a schematic diagram showing expression of images controlled by an area coverage modulation method.

FIG. 9 is a schematic diagram showing expression of images controlled by an area coverage modulation method. In the present embodiment, it is assumed for ease of explanation that the print head is controlled by two values: ejection and non-ejection of an ink droplet. In the present embodiment, it is also assumed that on/off of ink is controlled for each pixel defined by an output resolution of the image forming apparatus 111 and that a state in which all pixels of a unit area are turned on is treated as an ink printing amount 100%. Incidentally, "on" indicates ejection of ink and "off" indicates non-ejection of ink. In such a binary printer, since a single pixel can express an ink printing amount only by 100% or 0%, a middle tone is expressed by a group of pixels.

In the example shown in FIG. 9, instead of expressing a middle tone at a density of 25% as shown in the lower left of the drawing, ink is ejected to four pixels out of 16 pixels (4×4 pixels) as shown in the lower right of the drawing to express 25% (4/16) in terms of an area. Other tones can also be expressed in the same manner. It should be noted that the total number of pixels, the pattern of pixels to be turned on, and the like, to express a middle tone are not limited to those in the above example. The pattern of pixels to be turned on can be determined using periodic screen processing called halftone or error diffusion processing. It should also be noted that the above binarization processing can be expanded to multi-level quantization processing into modulable multiple levels and thereby applied to a print head capable of modulating an ink ejection amount and is not limited to binarization.

Flowchart Executed by Image Processing Apparatus 1

As stated above, one of factors for enabling perception of a three-dimensional appearance in a printed product is the reproduction of a change of brightness caused by a change of a geometric condition such as a light source position or a camera posture. A description will be given of a method of determining a suitable amount of metallic ink used to reproduce a change of the geometric condition.

Figure 10:
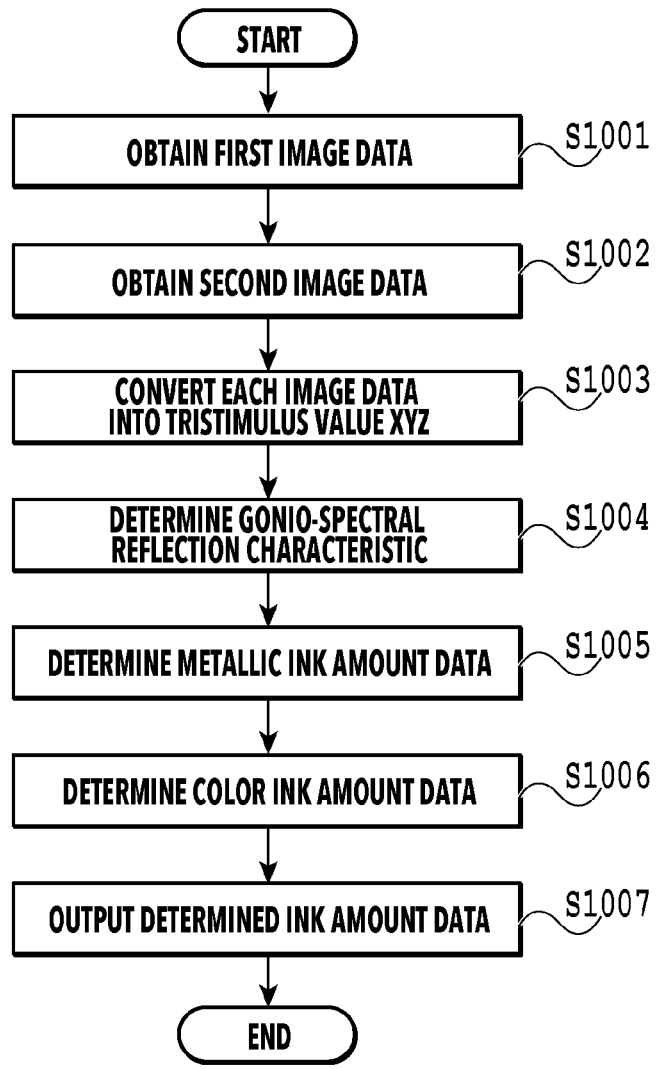
FIG. 10 is a flowchart of determination of an amount of ink.

FIG. 10 is a flowchart showing the procedure for the image processing apparatus 1 outputting data for forming an image on a print medium to the image forming apparatus 111 in the present embodiment. Processing in each step of FIG. 10 is performed by the CPU 101 of the image processing apparatus 1 loading a program code stored in the ROM 102 into the RAM 103 and executing the program code. Sign "S" in the description of the processing indicates a step in the flowchart.

In S1001, the first image obtaining unit 601 first obtains, from an external device such as the HDD 113, an image to be formed on a print medium, that is, first image data to be printed. A pixel value of a pixel position (x, y) is $RGB_1$ (x, y). The first image data is an image having color information of 16 bits for each of red (R), green (G), and blue (B) values, 48 bits in total for each pixel. Pixel values of the first image data in the present embodiment are RGB values defined in a sRGB space. It is also possible to use other generally used images such as an RGB image defined by Adobe RGB, a Lab image conforming to CIELAB, and an HSV image consisting of hue, saturation, and brightness. Incidentally, the pixel position (x, y) indicates a pixel position in an image in a case when a horizontal coordinate of a pixel is x and a vertical coordinate of a pixel is y.

In S1002, the second image obtaining unit 602 obtains, from an external device such as the HDD 113, second image data $RGB_2$ (x, y) indicating an image to be formed on a print medium. Like the first image data, the second image data also has 16-bit RGB values for each color defined in the sRGB space. As described above, the first image data and the second image data are images indicating scenes of the same subject under different geometric conditions. More specifically, one image shows a condition that light in the normal reflection direction is reflected and the other is an image in which light in the diffuse direction is reflected.

In S1003, the color conversion unit 603 converts each of the first image data obtained by the first image obtaining unit 601 and the second image data obtained by the second image obtaining unit 602 into a tristimulus value XYZ. The color conversion unit 603 converts the pixel values $RGB_1$ (x, y) and $RGB_2$ (x, y), which are RGB values, into tristimulus values (XYZ values) defined in a CIE 1913 XYZ color space. More specifically, the converted pixel values $XYZ_1$ (x, y) and $XYZ_2$ (x, y) are calculated based on the following formulas (1) and (2):

$$R_L = \text{degamma}(R) \quad \text{Formula (1)}$$
$$G_L = \text{degamma}(G)$$
$$B_L = \text{degamma}(B)$$

$$\begin{pmatrix} X \\ Y \\ Z \end{pmatrix} = M \begin{pmatrix} R_L \\ G_L \\ B_L \end{pmatrix} \quad \text{Formula (2)}$$

In the above formulas, R, G, and B are R, G, and B values constituting $RGB_1$ (x, y) and $RGB_2$ (x, y). The gamma characteristics corresponding to standard display characteristics are applied to a RGB value defined in the sRGB space. Degamma is a function to transform the R, G, and B values into linear R, G, and B values $R_L$, $G_L$, and $B_L$ linear with respect to X, Y, and Z values to be described later. X, Y, and Z are X, Y, and Z values constituting $XYZ_1$ (x, y) and $XYZ_2$ (x, y). M is a transformation matrix which transforms linear R, G, and B values defined in the sRGB space into X, Y, and Z values defined in the CIE 1913 XYZ color space.

In S1004, the gonio-spectral reflection characteristic determination unit 604 determines a gonio-spectral reflection characteristic using a Y value indicating brightness out of the X, Y, and Z values of each of the first image data and the second image data. In the present embodiment, a difference in brightness in the case of a change from the first image data to the second image data is calculated. Accordingly, a gonio-spectral reflection characteristic ΔY can be calculated by obtaining a difference between the Y value of the first image data and the Y value of the second image data as shown in the following formula (3):

$$\Delta Y = Y_1 - Y_2 \quad \text{Formula (3)}$$

In S1005, the metallic ink amount determination unit 605 calculates a metallic ink amount Me (x, y) based on $Y_1$ (x, y), $Y_2$ (x, y), and the gonio-spectral reflection characteristic $\Delta Y$ obtained by the formula (3), using the formula (4):

$$Me(x, y) = \frac{\Delta Y(x, y) - \Delta Y_{min}}{\Delta Y_{max} - \Delta Y_{min}} \quad \text{Formula (4)}$$

In the above formula, $\Delta Y_{max}$ is a maximum value of $\Delta Y$ (x, y) and $\Delta Y_{min}$ is a minimum value of $\Delta Y$ (x, y). The formula (4) is general normalization processing, where the maximum value of Me is 1 and the minimum value thereof is 0. The maximum value 1 corresponds to an area ratio 100% and the minimum value 0 corresponds to an area ratio 0% in the area coverage modulation shown in FIG. 9. That is, in the case of a change from the first image data to the second image data, the processing increases the amount of metallic ink for use along with the brightness for each coordinate. In short, the large amount of metallic ink is applied to coordinates to be bright and no metallic ink is applied to coordinates to be dark. Although the relationship between $\Delta Y$ and the metallic ink amount Me is linear in the present embodiment, it is also possible to use an appropriate function or lookup table (LUT) process to adjust tone characteristics or the maximum and minimum values of the metallic ink amount Me.

In S1006, the color ink amount determination unit 606 determines color ink amounts C, M, Y, and K based on $XYZ_1$, which is the XYZ value of the first image data determined by the color conversion unit 603, and the metallic ink amount Me determined by the metallic ink amount determination unit 605. Here, the first image is treated as a target value in an observation environment under little influence of normal reflection light and the color ink amounts are determined in consideration of the influence of a diffuse color of the metallic ink determined in advance. First, $XYZ_{color}$, which is an XYZ value in the color ink, is determined by the following formula (5):

$$XYZ_{color} = XYZ_1 / XYZ_{Me} \quad \text{Formula (5)}$$

In the above formula, $XYZ_{Me}$ is an XYZ value indicating the diffuse color of the metallic ink. $XYZ_{Me}$ can be determined by, for example, storing the relationship between the metallic ink amount Me and a colorimetric value as a LUT in advance by a 0°/45° colorimeter excluding the influence of normal reflection light. In a case when a color development model capable of obtaining an XYZ value of a printed product by multiplying the XYZ value of the metallic ink by the XYZ value of the color ink is established, a necessary XYZ value in the color ink can be obtained by dividing the target value $XYZ_1$ by $XYZ_{Me}$. Incidentally, this step is performed to adjust the amount of color ink because the brightness of the diffusion light is reduced by the amount of metallic ink applied. In order to determine the color ink values C, M, Y, and K from $XYZ_{color}$, various general methods such as a method of using a LUT prepared in advance can be used. In a case when the determined $XYZ_{color}$ cannot be reproduced, it is only necessary to put it in the reproducible range by clipping, or the like. Alternatively, a method of adjusting the amount of metallic ink can also be considered in order to put $XYZ_{color}$ in the reproducible range.

In S1007, the output unit 607 outputs, to the external image forming apparatus 111, the metallic ink amount Me determined by the metallic ink amount determination unit 605 and the color ink amounts C, M, Y, and K determined by the color ink amount determination unit 606, and finishes the processing.

As described above, according to the present embodiment, a three-dimensional appearance can be suitably given to an object or subject to be reproduced as an image. More specifically, a change of brightness of light reflected on the subject due to a difference in light source position can be reproduced by printing a printed product using the metallic ink based on the above flowchart. This makes it possible to form such a printed product that the first image data is reproduced like a conventional printed product in an observation environment in which a main light source is not reflected and the amount of change of brightness is controlled for each position of the image in an observation environment in which the main light source is intentionally reflected. As a result, a change of brightness of a three-dimensional object according to the geometric condition can be simulated in a two-dimensional image and a suitable three-dimensional appearance can be given to an object or subject to be reproduced as an image.

Incidentally, each of the ink amounts C, M, Y, K, and Me may be determined at the stage of calculation of $XYZ_1$ and $XYZ_2$ by the formula (2) by referring to a preset LUT describing correspondence between $X_1$, $Y_1$, $Z_1$, and $Y_2$ and each of the ink amounts C, M, Y, K, and Me.

Second Embodiment

In the first embodiment, an example of inputting two types of image data and determining the amount of metallic ink applied from a difference in brightness between the two types of image data has been described. In the present embodiment, a description will be given of an example of determining an ink amount by generating virtual second image data different in geometric condition from first image data.

The description of commonalities with the first embodiment will be omitted or simplified and differences will be mainly described below.

Logical Configuration of Image Processing Apparatus 1

Figure 11:
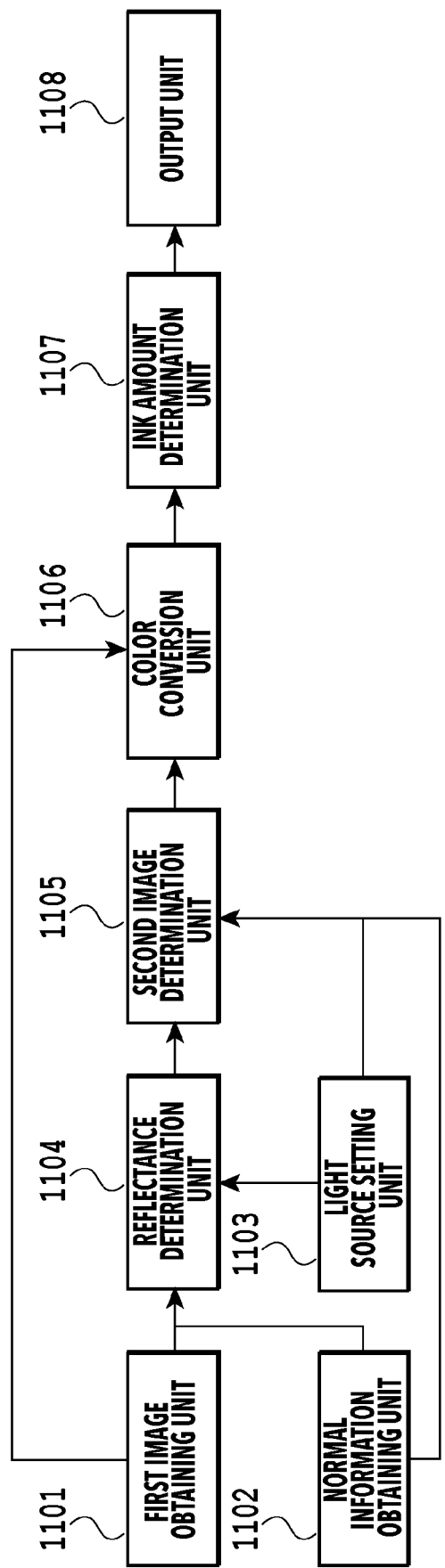
FIG. 11 is a diagram showing a logical configuration of the image processing apparatus.

FIG. 11 is a diagram showing a logical configuration of an image processing apparatus 1 in the present embodiment. The image processing apparatus 1 comprises a first image obtaining unit 1101, a normal information obtaining unit 1102, a light source setting unit 1103, a reflectance determination unit 1104, a second image determination unit 1105, a color conversion unit 1106, an ink amount determination unit 1107, and an output unit 1108.

The first image obtaining unit 1101 obtains first image data indicating a scene of a subject under a geometric condition. The normal information obtaining unit 1102 obtains normal information on the subject in the first image data. The normal information is information indicating a direction of a microfacet of a three-dimensional subject reproduced by each coordinate of the first image. The light source setting unit 1103 sets light source information on scenes indicated by the first image data and second image data to be described later. The light source information is information indicating a direction of a light source toward the subject. The reflectance determination unit 1104 determines a reflectance of the subject from the first image data, the normal information, and the light source information. The second image determination unit 1105 generates second image data from the normal information, the light source information, and the reflectance of the subject. The color conversion unit 1106 converts color information of the first image data and second image data into tristimulus values XYZ. The ink amount determination unit 1107 determines ink amount data on each color from the tristimulus values of the first image data and second image data. The output unit 1108 outputs the determined ink amount data to the image forming apparatus 111.

Flowchart Executed by Image Processing Apparatus 1

Figure 12:
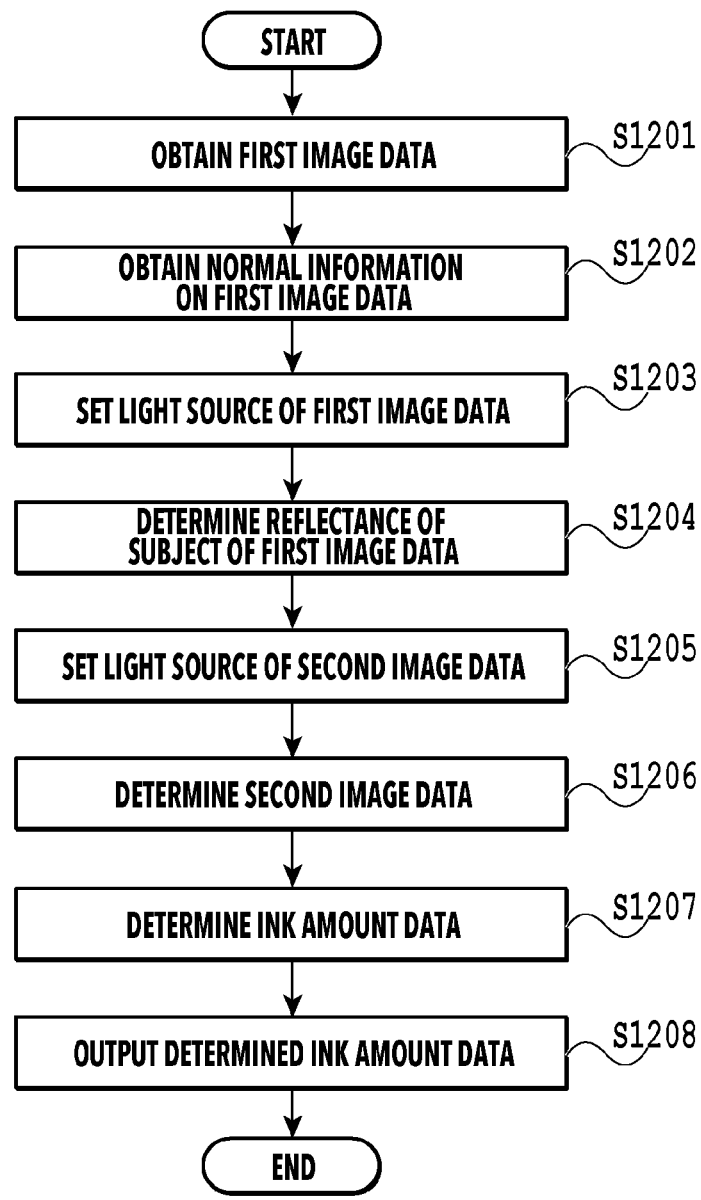
FIG. 12 is a flowchart of determination of an amount of ink.

FIG. 12 is a flowchart showing the procedure for the image processing apparatus 1 outputting data for forming an image on a print medium to the image forming apparatus 111 in the present embodiment. Processing in each step of FIG. 12 is performed by the CPU 101 of the image processing apparatus 1 loading a program code stored in the ROM 102 into the RAM 103 and executing the program code. Sign "S" in the description of the processing indicates a step in the flowchart.

In S1201, the first image obtaining unit 1101 first obtains first image data $RGB_1$ (x, y). Since the first image obtaining unit 1101 is identical to the first image obtaining unit 601 in the first embodiment, a detailed explanation thereof is omitted.

In S1202, the normal information obtaining unit 1102 obtains, from an external device such as the HDD 113, a normal vector corresponding to the first image data: $\vec{n}(x, y)$ In the description below, the vector will be denoted as n (x, y) omitting the arrow (except for the formulas).

Here, the normal n is a three-dimensional vector indicating a direction of a microfacet of the three-dimensional subject reproduced in each of coordinates x, y of the first image. Accordingly, the normal information can be obtained by the use of a stereo camera, or the like, simultaneously with the capturing of the first image. Alternatively, the normal information can be obtained from a 3D CG model together with a rendered image.

In S1203, the light source setting unit 1103 sets a light source vector in the scene indicated by the first image:

$$\vec{L}_1$$

In the description below, the vector will be denoted as $L_1$ omitting the arrow (except for the formulas). The light source vector $L_1$ is a three-dimensional vector indicating a direction from which a light source illuminates the subject. For example, like the normal information, the direction of the main light source can be acquired by obtaining an omnidirectional luminance distribution of the scene by the use of a fish-eye lens, or the like, at the time of capturing. Alternatively, as mentioned in S1202, the information can be obtained from a 3D CG model. A method of providing an arbitrary value by a user is also considered. In the present embodiment, the information does not necessarily have to be precise as long as a change of brightness under different geometric conditions can be reproduced and a three-dimensional appearance can be perceived. For example, the light source direction may be set in advance at the same position as the camera, that is, a direction orthogonal to the captured two-dimensional image.

In S1204, the reflectance determination unit 1104 calculates a reflectance Ref (x, y) of the subject of the first image using the following formula (6):

$$\text{Ref} = I_1/(\vec{L}_1 \cdot \vec{n}) \quad \text{Formula (6)}$$

In the above formula, $I_1$ indicates the brightness of the first image and consists of linear R, G, and B values $R_L$, $G_L$, and $B_L$ obtained by converting $RGB_1$ based on the formula (1). The reflectance Ref consists of reflectances $R_{RL}$, $R_{GL}$, and $R_{BL}$ for the respective three channels of the linear R, G, and B values $R_L$, $G_L$, and $B_L$ of the brightness $I_1$ of the image. $L_1 \cdot n$ indicates the inner product of the light source vector L1 and the normal vector n. This means that the reflectance is calculated backward using a model in which the brightness of the first image is determined by reflection light in a so-called diffuse direction obtained from "an angle between a light source and a normal" and "a reflectance of a subject."

In S1205, the light source setting unit 1103 arbitrarily sets a light source vector $L_2$ of second image data. Since the light source vector $L_2$ does not necessarily have to be precise information like the light source vector $L_1$ explained above, it is also possible to preset a vector at a predetermined angle with the light source vector $L_1$.

In S1206, the second image determination unit 1105 calculates second image data $I_2$ using the following formula (7):

$$I_2 = \text{Ref} \cdot \vec{L}_2 \cdot \vec{n}; \quad \text{Formula (7)}$$

In the above formula, $I_2$ indicates the brightness of the second image and consists of linear R, G, and B values $R_L$, $G_L$, and $B_L$.

In S1207, the ink amount determination unit 1107 determines color ink amounts C, M, Y, and K and a metallic ink amount Me. More specifically, the color conversion unit 1106 first converts the brightness $I_1$ of the first image and the brightness $I_2$ of the second image into $XYZ_1$ and $XYZ_2$, respectively, based on the formula (2). In the present embodiment, the ink amounts C, M, Y, K, and Me are determined by referring to a preset LUT describing the correspondence between $X_1$, $Y_1$, $Z_1$, and $Y_2$ and each of the ink amounts C, M, Y, K, and Me. The ink amounts may be determined by the same method as the first embodiment using $XYZ_1$ and $XYZ_2$.

In S1208, the output unit 1108 outputs the ink amounts C, M, Y, K, and Me to the external image forming apparatus 111.

As described above, according to the present embodiment, a suitable three-dimensional appearance can be given without inputting two types of image data by generating virtual second image data different in geometric condition from first image data.

Other Embodiments

In the embodiments described above, the metallic ink is used as an ink having a bias in gonio-spectral reflection characteristics. The same advantageous result can also be produced by using a so-called gloss-controlled ink such as a clear ink that smooths the surface of a print and strengthens normal reflection light or a high refractive ink that obtains strong normal reflection light using a material having a high refractive index.

In the first embodiment, in the step of determining color ink amounts, the XYZ value for the color ink is determined according to the color development model combining XYZ values. Other color development models or simulations suitable for an image forming apparatus in use can also be used.

In the second embodiment, a simple model using a light source vector, a normal vector, and a reflectance is described as a model for determining reflection light. As a different method, it is also possible to use a different model using specular reflection light used in computer graphics, environment light called ambient light, or the like.

In the step of ink amount determination in the second embodiment, $X_1$, $Y_1$, $Z_1$, and $Y_2$ are input to the LUT. However, $Y_2$ can be replaced with $\Delta Y$, norm$\Delta Y$ obtained by normalizing $\Delta Y$, or the like. In addition, a method of using a LUT to which $X_1$, $Y_1$, $Z_1$, $X_2$, $Y_2$, and $Z_2$ are input in consideration of the tint of the second image instead of the change of brightness information is also considered. Alternatively, it is also possible to use a Lab value, HSV value, or RGB value obtained by color conversion of the above values.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus generating data for forming an image on a print medium, the image processing apparatus comprising:
    at least one processor and a memory storing instructions that, when executed by the at least one processor, causes the image processing apparatus to function as:
    a first obtaining unit configured to obtain first image data to be printed;
    a second obtaining unit configured to obtain second image data indicating a subject identical to that of the first image data and expressed by a geometric condition different from that of the first image data; and
    a first determination unit configured to determine ink amounts of respective inks including a first ink and a second ink based on brightness at each position of the first image data and the second image data,
    wherein the image is printed using the first ink that reflects light in a normal reflection direction at an intensity different from an intensity of light reflected in a diffuse direction in a case when light is made incident at a predetermined angle on the first ink provided on the medium, and the second ink that is different from the first ink and has a ratio of an intensity of light reflected in the normal reflection direction to an intensity of light reflected in the diffuse direction smaller than that of the first ink in a case when light is made incident at the predetermined angle on the second ink provided on the medium.

2. The image processing apparatus according to claim 1, further comprising a second determination unit configured to determine a gonio-spectral reflection characteristic indicating an intensity of brightness of each position of an image based on the first image data and the second image data,
    wherein the first determination unit determines the ink amounts of the respective inks using the gonio-spectral reflection characteristic determined by the second determination unit.

3. The image processing apparatus according to claim 2, wherein the gonio-spectral reflection characteristic includes information on brightness of at least two types of image data expressed by different geometric conditions.

4. The image processing apparatus according to claim 2, wherein the second determination unit determines information on brightness in the normal reflection direction from one of the first image data and the second image data, and determines information on brightness in the diffuse direction from the other of the first image data and the second image data.

5. The image processing apparatus according to claim 2, wherein the second determination unit determines the gonio-spectral reflection characteristic from a difference in brightness between the first image data and the second image data.

6. The image processing apparatus according to claim 2, wherein the first determination unit determines an ink amount of the first ink based on the gonio-spectral reflection characteristic and determines an ink amount of the second ink based on the first image data or the second image data and the determined ink amount of the first ink.

7. The image processing apparatus according to claim 1, wherein, in a case of a change from the first image data to the second image data, the first determination unit increases a use amount of the first ink according to brightness of each coordinate.

8. The image processing apparatus according to claim 1, wherein the second obtaining unit obtains second image data in which a light source is set at an arbitrary position different from a position of the light source in the first image data using a reflectance that can be expressed by information on brightness included in the first image data and light source information and normal information corresponding to the first image data.

9. The image processing apparatus according to claim 1, wherein the first determination unit determines the respective ink amounts using a lookup table having a function that receives input of information on brightness of the first image data and the second image data, and outputs the respective ink amounts.

10. The image processing apparatus according to claim 1, wherein the first ink includes at least one of a metallic ink, a gross-controlled ink, and a high refractive ink.

11. The image processing apparatus according to claim 1, wherein the second ink is a color ink including cyan, magenta, yellow, and black (CMYK).

12. An image processing method of generating data for forming an image on a print medium, the image processing method comprising:
    obtaining first image data to be printed;

obtaining second image data indicating a subject identical to that of the first image data and expressed by a geometric condition different from that of the first image data; and determining ink amounts of respective inks including a first ink and a second ink based on brightness at each position of the first image data and the second image data, wherein the image is printed using the first ink that reflects light in a normal reflection direction at an intensity different from an intensity of light reflected in a diffuse direction in a case when light is made incident at a predetermined angle on the first ink provided on the medium, and the second ink which is different from the first ink and has a ratio of an intensity of light reflected in the normal reflection direction to an intensity of light reflected in the diffuse direction smaller than that of the first ink in a case when light is made incident at the predetermined angle on the second ink provided on the medium.

13. The image processing method according to claim 12, further comprising determining a gonio-spectral reflection characteristic indicating an intensity of brightness of each position of an image based on the first image data and the second image data, wherein determining the ink amounts of the respective inks determines the ink amounts of the respective inks by using the gonio-spectral reflection characteristic determined by determining the gonio-spectral reflection characteristic.

14. The image processing method according to claim 13, wherein the gonio-spectral reflection characteristic includes information on brightness of at least two types of image data expressed by different geometric conditions.

15. The image processing method according to claim 13, wherein determining the gonio-spectral reflection characteristic determines information on brightness in the normal reflection direction from one of the first image data and the second image data, and determines information on brightness in the diffuse direction from the other of the first image data and the second image data.

16. The image processing method according to claim 13, wherein determining the gonio-spectral reflection characteristic determines the gonio-spectral reflection characteristic from a difference in brightness between the first image data and the second image data.

17. The image processing method according to claim 13, wherein determining the ink amounts of the respective inks determines an ink amount of the first ink based on the gonio-spectral reflection characteristic and determines an ink amount of the second ink based on the first image data or the second image data and the determined ink amount of the first ink.

18. The image processing method according to claim 12, wherein, in a case of a change from the first image data to the second image data, determining the ink amounts of the respective inks increases a use amount of the first ink according to brightness of each coordinate.

19. The image processing method according to claim 12, wherein determining the gonio-spectral reflection characteristic obtains second image data in which a light source is set at an arbitrary position different from a position of the light source in the first image data using a reflectance that can be expressed by information on brightness included in the first image data and light source information and normal information corresponding to the first image data.

20. A non-transitory computer-readable storage medium storing a program that causes a computer to function as an image processing apparatus generating data for forming an image on a print medium, the program causing the computer to function as:

a first obtaining unit configured to obtain first image data to be printed;

a second obtaining unit configured to obtain second image data indicating a subject identical to that of the first image data and expressed by a geometric condition different from that of the first image data; and a first unit configured to determine ink amounts of respective inks including a first ink and a second ink based on brightness at each position of the first image data and the second image data, wherein the image is printed using the first ink that reflects light in a normal reflection direction at an intensity different from an intensity of light reflected in a diffuse direction in a case when light is made incident at a predetermined angle on the first ink provided on the medium, and the second ink that is different from the first ink and has a ratio of an intensity of light reflected in the normal reflection direction to an intensity of light reflected in the diffuse direction smaller than that of the first ink in a case where light is made incident at the predetermined angle on the second ink provided on the medium.

* * * * *